Dec. 17, 1929. C. L. JOHNSON 1,740,096
LOCKING MEANS FOR AUTOMATIC GEAR SHIFT MECHANISMS
Filed Nov. 9, 1925  2 Sheets-Sheet 1
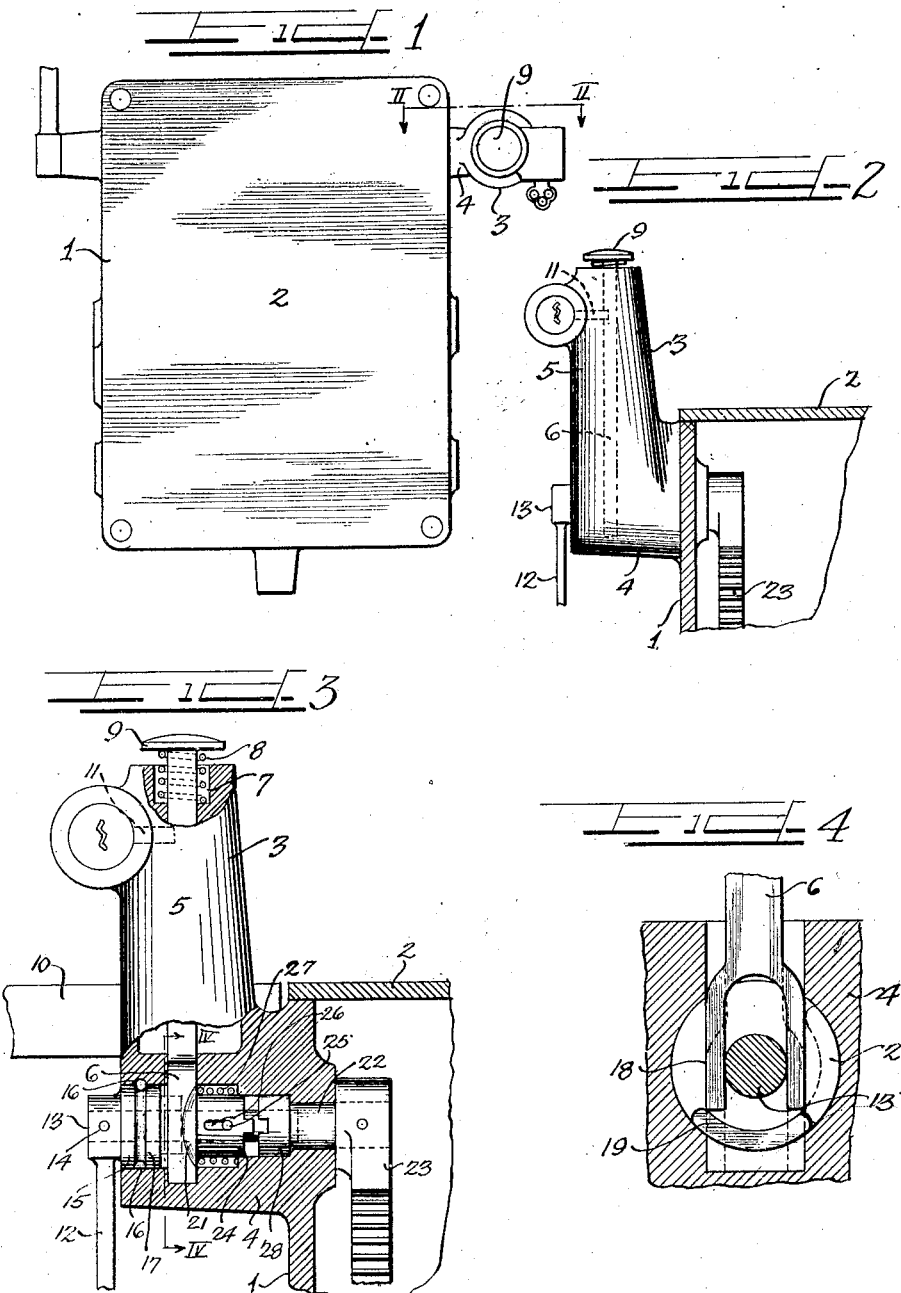

Dec. 17, 1929.  C. L. JOHNSON  1,740,096
LOCKING MEANS FOR AUTOMATIC GEAR SHIFT MECHANISMS
Filed Nov. 9, 1925  2 Sheets-Sheet 2
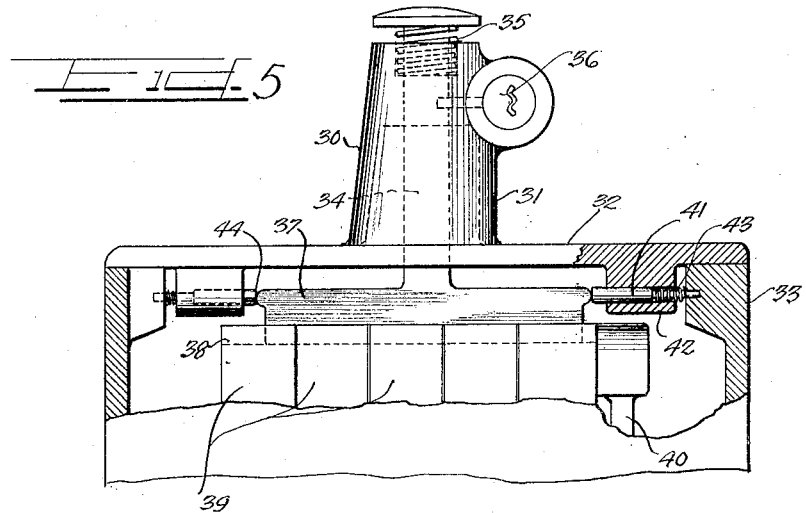
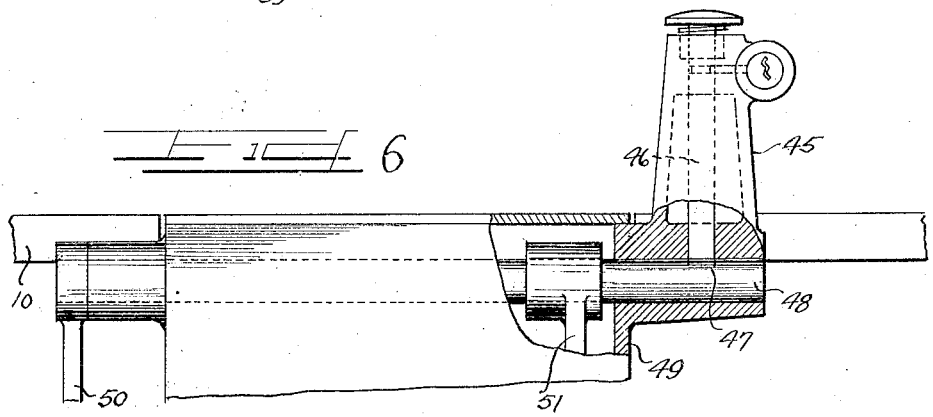
Inventor
Colvin L. Johnson
By Charles... Atty's Patented Dec. 17, 1929

1,740,096

UNITED STATES PATENT OFFICE

COLVIN L. JOHNSON, OF ST. LOUIS, MISSOURI, ASSIGNOR, BY MESNE ASSIGNMENTS, TO JOHNSON AUTOMOBILE LOCK COMPANY, OF ST. LOUIS, MISSOURI, A CORPORATION OF MISSOURI

LOCKING MEANS FOR AUTOMATIC GEAR-SHIFT MECHANISMS

Application filed November 9, 1925. Serial No. 67,778.

This invention relates to a lock for automatic gear shifting mechanisms for automobiles and more particularly to a lock for that type of mechanical gear shift in which a manually operated selector lever selectively sets the train of mechanism for subsequent actual operation of the gears by means of the usual clutch throwing lever, or pedal.

It is therefore an object of this invention to provide means for locking an automatic gear shifting mechanism to prevent the same from being operated by an unauthorized person.

Other and further important objects of this invention will be apparent from the disclosures in the specification and accompanying drawings.

The invention in a preferred form is illustrated in the drawings and hereinafter more fully described.

On the drawings:

Figure 1 is a top plan view of a housing encasing a gear shifting mechanism, showing the locking device of my invention associated therewith.

Figure 2 is a fragmentary enlarged sectional view taken on line II—II of Figure 1 showing the lock in elevation.

Figure 3 is an enlarged fragmentary view with parts broken away in section.

Figure 4 is a sectional view taken on line IV—IV of Figure 3.

Figure 5 is an elevational view of a modified form of my device showing parts broken away in section.

Figure 6 is a second modification of my device showing parts broken away in section.

As shown on the drawings:

The locking device of my invention is here shown in connection with an automatic gear shifting mechanism for automobiles. There is shown a casing 1 having a top cover plate 2 and enclosing the gear shifting mechanism, which of itself forms no part of this invention. Said gear shifting mechanism is adapted to be selectively set for shifting the gears into a given position by means of a selector lever, the actual shifting of the gear being accomplished by the throwing of the usual clutch pedal or lever.

In Figures 1 to 4 inclusive there is shown a locking device 3 adapted to render the selector lever inoperative. The lock 3 is formed integral with a boss 4 extending from one side of the casing and comprising a vertical extension 5 of said boss 4 having a passage therein through which extends a locking bolt 6. A recess 7 is provided in the top of said extension 5 surrounding the locking bolt 6 and is adapted to receive a helical spring 8, which surrounds said bolt 6 and presses against the under surface of a head 9 formed on said bolt. The extension 5 normally extends above the floor board 10 so that the bolt 6 may be operated by stepping on the head 9. When the bolt 6 is so depressed against the compression of the spring 8, it is adapted to be locked in place by means of a key-operated bolt 11, which in locking position engages in a groove provided for the purpose in the locking bolt 6.

When the locking bolt 6 is in depressed position, as shown in Figure 3, it renders inoperative the action of the selector lever, as will now be described. Said selector lever is connected by means of a train of levers including a rod 12 to a shaft 13 extending horizontally through the boss 4. Said rod 12 is secured to the shaft 13 by means of a pin 14 whereby rotation of the shaft 13 is effected by movement of the rod 12. An extension 15 integrally formed on the end of the rod 12 is rotatably mounted in the boss 4, but is prevented from longitudinal movement by means of pins 16 projecting from said boss 4 into a circumferential groove 17 in said extension. The locking bolt 6 is provided with lower bifurcated ends 18 adapted to straddle the shaft 13. An arcuate lug 19 is formed on the inner face of the extension 15, said lug being so positioned as to extend beneath the lower bifurcated ends 18 of the locking bolt 6 when said bolt is raised to prevent said bolt 6 from being depressed except when the gears are in neutral. When the gears are in neutral the lug 19 assumes the dotted position 20 shown in Figure 4, in which position the bolt 6 may be depressed into locking position. The inner faces of the bifurcated ends 18 are recessed as at 21 for a purpose now to appear. Said shaft 13 extends into a hollow end of a second shaft 22 coaxial therewith and having mounted at its other end a quadrant lever 23 for setting the gear shifting mechanism. A clutch member 24 is slidably mounted on the shaft 13 by means of a pin 25 extending through a slot 26 in said member. Said clutch is adapted to be resiliently forced by means of a spring 27 into engagement with the recess 21 formed in said bifurcated ends 18 when the locking bolt 6 is in depressed position.

When, however, the locking bolt 6 is unlocked and allowed to slide up under the action of the spring 8, the clutch member 24 is thereby forced inwardly into engagement with a notched collar 28 secured on the shaft 22. Operation of the selector lever now acts through the rod 12 and shaft 13 to rotate the clutch member 24 and collar 28 meshed therewith and to thereby alter the position of the quadrant lever 23. It will be understood that for definite positions of said quadrant lever 23 certain trains of gear shifting mechanisms are alined and others thrown out of alinement whereby upon operation of the clutch throwing lever the gear shifting mechanism in alinement will be operated to change the drive into the desired gear.

On the other hand when the locking bolt 6 is depressed and locked in that position, which can only occur when the gears are in neutral, the clutch member 24 is thrown by means of the spring 29 into the recess 21 provided in the bifurcated end 18 of said locking bolt and at the same time is thrown out of engagement with the collar 28. As is obvious, the car cannot be run with the locking bolt in this position, because the gears are in neutral.

In Figure 5 there is shown a locking device 30 of a construction similar to the arrangement described but so positioned with respect to the gear shifting mechanism as to lock a different portion of said mechanism. Said locking device 30 comprises a boss 31 formed integral with a cover plate 32 of a housing 33. A locking bolt 34 extends through said boss 31 and is adapted to be depressed against the pressure of a spring 35 and locked in that position by a key-operated locking means 36. The lower end of said bolt 34 is provided with a cross-head 37 adapted in depressed position to extend into a groove 38 formed in a set of cams 39. Said cams 39 are connected by a train of levers including a lever 40 to the usual clutch throwing pedal. Since the cams 39 are operated through the clutch pedal to shift the gears it is obvious that when the bolt 34 is depressed and the cross-head 37 positioned in the groove 38 said cams are locked inoperatively. Depression of the locking bolt 34 also serves to lock the cover plate 32 by forcing pins 41 into recesses formed in the casing 33. The pins 41 are here shown as slidably mounted in a depending lug 42 formed on the under side of the cover plate 32. Springs 43 surrounding said pins 41 and secured thereto resiliently force said pins inwardly against cam surfaces 44 formed on the ends of said cross-head 37. When the locking bolt 34 is unlocked, thereby allowing it to be forced upwardly by the spring 35 said cam surfaces 44 allow the pins 41 to be resiliently forced inwardly out of the recesses in the casing 33. Means are thus provided for simultaneously locking the cover plate of the housing encasing the gear shifting mechanism as well as for locking the gear shifting mechanism itself.

In Figure 6 there is shown a second modification of my locking device applicable for locking any one of the various shafts in the gear shifting mechanism but preferably for locking the shaft directly operable by the clutch pedal. There is shown a locking device 45 having a locking bolt 46 adapted to extend into a recess 47 formed in a shaft 48. Said shaft 48 is rotatably mounted in a housing 49 similar to the housings heretofore shown for encasing the gear shifting mechanism. One end of the rod 48 is secured to a lever 50 directly operated by the clutch pedal. Other levers such as 51 are secured to the shaft 48 for operating the gear shifting mechanism. It is obvious that when the locking bolt 46 is depressed into engagement with the groove 47 of the shaft 48 further rotation of the shaft 48 by means of the lever 50 is impossible. It is thus seen that in the locking device above described I have provided means whereby gear shifting mechanisms of the automatic type may be successively locked against operation by unauthorized persons.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. A device of the class described, comprising a pair of coaxial shafts adapted to cooperate in shifting gear mechanism, coacting clutch engaging parts on said shafts, a locking bolt having one of its ends formed to engage and throw said clutch parts into engagement in one position, and resilient means operating to disengage said clutch member parts when said locking bolt is in another position.

2. In combination clutch operated means for shifting gears, and a locking bolt having one of its ends engaging said means to render said clutch operative in one position and to render said clutch inoperative in another position.

3. In combination clutch operated means for shifting gears, a locking bolt to render said clutch operative in one position and to render said clutch inoperative in another position, and means coacting with said locking bolt for preventing the clutch from being rendered inoperative except when the gears operated by said clutch means are in a given position.

4. A device of the class described, comprising a pair of coaxial shafts, cooperating clutch mechanisms on said shafts, resilient means tending to disengage said clutch mechanisms, and a locking bolt having a bifurcated end straddling one of said shafts and arranged to hold said clutch mechanisms in engagement when it is in a given position.

5. A device of the class described, comprising a pair of coaxial shafts, cooperating clutch mechanisms on said shafts, resilient means tending to disengage said clutch mechanisms, a locking bolt having a bifurcated end straddling one of said shafts and adapted in one position to hold such clutch mechanisms in engagement and in another position to permit said resilient means to hold said clutch mechanisms in disengagement, and means for locking said locking bolt in said last position.

6. A device of the class described, comprising a pair of coaxial shafts forming a part of a given mechanism, coacting clutch members associated with said shafts, resilient means normally separating said clutch members, and a depressible locking bolt adapted to be locked in depressed position, said locking bolt having a depression therein to receive one of said clutch members when said bolt is in depressed position, whereby said mechanism is rendered inoperative.

7. A device of the class described, comprising a pair of coaxial shafts forming a part of a given mechanism, coacting clutch members connected to said shafts, resilient means normally separating said clutch members, a depressible locking bolt adapted to be locked in depressed position, said locking bolt having a depression therein to receive one of said clutch members when said bolt is in depressed position, whereby said mechanism is rendered inoperative, and resilient means associated with said locking bolt to raise the same and thereby to throw said clutch members into engagement when said locking bolt is unlocked.

8. A device of the class described, comprising a pair of coaxial shafts forming a part of a given mechanism, coacting clutch members connected to said shafts, resilient means normally separating said clutch members, a depressible locking bolt adapted to be locked in depressed position, said locking bolt having a depression therein to receive one of said clutch members when said bolt is in depressed position, whereby said mechanism is rendered inoperative, and means for preventing the depression of said locking bolt except when the mechanism is in a given position.

9. In combination, gear mechanism, coaxial shaft members adapted to cooperate together in the shifting of said mechanism, a clutch for coupling said shaft members together, lock means including a locking bolt cooperable with said clutch for controlling the position of said clutch, and means associated with one of said shaft members for controlling the movement of said locking bolt in accordance with the position of said gear mechanism.

10. In combination, gear mechanism, a pair of coaxial shaft members adapted to cooperate in shifting said gear mechanism, cooperable clutch means on said members, a lock element for causing said clutch means to be moved into a position wherein said shafts are disconnected, and means associated with one of said shaft members for preventing said element from being operated to disconnect said shaft members when said gear mechanism is in any position other than a neutral position.

In testimony whereof I have hereunto subscribed my name.

COLVIN L. JOHNSON.